(12) United States Patent
Banach et al.

(10) Patent No.: US 12,012,487 B2
(45) Date of Patent: *Jun. 18, 2024

(54) IN-SITU ALKYLPHENOL-ALDEHYDE RESINS

(71) Applicant: SI GROUP, INC., Schenectady, NY (US)

(72) Inventors: Timothy Edward Banach, Schenectady, NY (US); John Morgan Whitney, Schenectady, NY (US); Jeffrey M. Hiscock, Schenectady, NY (US); Todd Scott Makenzie, Schenectady, NY (US); Gennaro Barbiero, Schenectady, NY (US)

(73) Assignee: SI GROUP, INC., The Woodlands, TX (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/407,947

(22) Filed: Aug. 20, 2021

(65) Prior Publication Data
US 2021/0380746 A1  Dec. 9, 2021

Related U.S. Application Data

(60) Continuation of application No. 16/842,221, filed on Apr. 7, 2020, now Pat. No. 11,155,667, which is a
(Continued)

(51) Int. Cl.
*C08G 8/12* (2006.01)
*C08G 8/24* (2006.01)
(Continued)

(52) U.S. Cl.
CPC ............... *C08G 8/12* (2013.01); *C08G 8/24* (2013.01); *C08G 8/28* (2013.01); *C08G 8/32* (2013.01);
(Continued)

(58) Field of Classification Search
CPC ............... C08G 8/10; C08G 8/12; C08G 8/24
(Continued)

(56) References Cited

U.S. PATENT DOCUMENTS 1,987,228 A  1/1935  Bruson et al.
2,091,965 A  9/1937  Cherry
(Continued)

FOREIGN PATENT DOCUMENTS

CN  101024679 A  8/2007
CN  101161616 A  4/2008
(Continued)

OTHER PUBLICATIONS

Gould, "Phenolic Resins" Reinhold Plastics Applications Series, pp. 26-29, 42-45 (1959).
(Continued)

*Primary Examiner* — Michael M Dollinger
(74) *Attorney, Agent, or Firm* — Jeffrey N. Townes; Cozen O'Connor

(57) ABSTRACT

The invention relates to an in-situ process for preparing an alkylphenol-aldehyde resin. The process comprises the step of providing a raw alkylphenol composition. The raw alkylphenol composition comprises one or more alkylphenol compounds and at least about 1 wt % phenol. Each alkylphenol compound has one or more alkyl substituents. The raw alkylphenol composition is reacted directly, without pre-purification, with one or more aldehydes to form an in-situ alkylphenol-aldehyde resin. The invention also relates to an in-situ alkylphenol-aldehyde resin formed from the in-situ process, and its use in a tackifier composition and rubber composition. The tackifier composition and rubber composition containing the in-situ alkylphenol-aldehyde resin show, inter alia, improved tack performance.

19 Claims, 3 Drawing Sheets

Related U.S. Application Data continuation of application No. 15/947,503, filed on Apr. 6, 2018, now Pat. No. 10,647,806, which is a division of application No. 14/514,636, filed on Oct. 15, 2014, now Pat. No. 9,944,744.

(60) Provisional application No. 61/892,213, filed on Oct. 17, 2013.

(51) Int. Cl.
| | |
|---|---|
| *C08G 8/28* | (2006.01) |
| *C08G 8/32* | (2006.01) |
| *C08L 7/00* | (2006.01) |
| *C08L 21/00* | (2006.01) |
| *C08L 61/06* | (2006.01) |
| *C08L 61/14* | (2006.01) |

(52) U.S. Cl.
CPC ............... *C08L 7/00* (2013.01); *C08L 21/00* (2013.01); *C08L 61/06* (2013.01); *C08L 61/14* (2013.01)

(58) Field of Classification Search
USPC ........................................................ 525/138
See application file for complete search history.

(56) References Cited

U.S. PATENT DOCUMENTS

| | | | |
|---|---|---|---|
| 2,228,028 A | 1/1941 | Brower | |
| RE23,183 E | 12/1949 | Arvin et al. | |
| 2,536,040 A | 1/1951 | Davidson | |
| 2,610,955 A | 9/1952 | De Groote et al. | |
| 2,800,451 A | 5/1953 | Mottern et al. | |
| 2,739,172 A | 3/1956 | Peters | |
| 3,438,931 A | 4/1969 | Mitchell et al. | |
| 3,624,038 A | 11/1971 | Weidner | |
| 3,962,156 A | 6/1976 | Harrop | |
| 4,022,942 A | 5/1977 | Anderson et al. | |
| 4,092,367 A | 5/1978 | Bridwell et al. | |
| 4,113,700 A | 9/1978 | Culbertson | |
| 4,131,618 A | 12/1978 | Weinstock et al. | |
| 4,146,512 A | 3/1979 | Weaver et al. | |
| 4,166,191 A | 8/1979 | Jeoka et al. | |
| 4,239,869 A | 12/1980 | Annis | |
| 4,260,704 A | 4/1981 | Schmidt et al. | |
| 4,263,248 A | 4/1981 | Annis | |
| 4,461,916 A | 7/1984 | Alfs et al. | |
| 4,604,436 A | 8/1986 | Thorpe et al. | |
| 4,708,809 A | 11/1987 | Davis | |
| 4,870,215 A | 9/1989 | Wiker et al. | |
| 4,914,246 A | 4/1990 | Oswald et al. | |
| 4,954,663 A | 9/1990 | Marler et al. | |
| 4,973,764 A | 11/1990 | Oswald et al. | |
| 5,039,437 A | 8/1991 | Martella et al. | |
| 5,089,589 A | 2/1992 | Hesse et al. | |
| 5,098,218 A * | 3/1992 | Reese ..................... | E01C 5/00 404/35 |
| 5,100,989 A | 3/1992 | Uhrig et al. | |
| 5,244,588 A | 9/1993 | Koshima et al. | |
| 5,262,508 A | 11/1993 | Martella et al. | |
| 5,399,786 A | 3/1995 | Queiroz et al. | |
| 5,734,078 A | 3/1998 | Feilden et al. | |
| 6,133,403 A | 10/2000 | Gerber | |
| 6,391,364 B1 | 5/2002 | Lindsay | |
| 6,433,242 B1 | 8/2002 | Wiese | |
| 6,608,162 B1 | 8/2003 | Chiu et al. | |
| 6,699,958 B1 | 3/2004 | Detlefsen | |
| 7,425,602 B2 | 9/2008 | Howard et al. | |
| 7,579,075 B2 | 8/2009 | Furusawa | |
| 8,030,418 B2 | 10/2011 | Banach et al. | |
| 8,470,930 B2 | 6/2013 | Howard et al. | |
| 8,557,930 B2 | 10/2013 | Banach et al. | |
| 9,670,303 B2 | 6/2017 | Yunfeng et al. | |
| 2002/0091224 A1 | 7/2002 | Saito et al. | |
| 2006/0020065 A1 | 1/2006 | Krull et al. | |
| 2006/0134446 A1 | 6/2006 | Stumpf | |
| 2006/0241276 A1 | 10/2006 | Natomi et al. | |
| 2007/0060718 A1 | 3/2007 | Juhue et al. | |
| 2007/0172755 A1 | 7/2007 | Nakamura et al. | |
| 2007/0299163 A1 | 12/2007 | Hwang et al. | |
| 2008/0269351 A1 | 10/2008 | Campbell et al. | |
| 2009/0062472 A1 | 3/2009 | Howard et al. | |
| 2010/0029527 A1 | 2/2010 | Campbell et al. | |
| 2010/0192456 A1 | 8/2010 | Krull et al. | |
| 2010/0317793 A1* | 12/2010 | Sandstrom ............ | C08K 3/013 264/176.1 |
| 2012/0015300 A1 | 1/2012 | Endo et al. | |
| 2012/0142193 A1 | 6/2012 | Ogihara et al. | |
| 2013/0018163 A1 | 1/2013 | Suzuki et al. | |
| 2014/0023969 A1 | 1/2014 | Imada et al. | |
| 2014/0080965 A1 | 3/2014 | Yunfeng et al. | |
| 2015/0024173 A1 | 1/2015 | Tahara et al. | |
| 2015/0112023 A1 | 4/2015 | Banach et al. | |
| 2015/0112024 A1 | 4/2015 | Banach et al. | |

FOREIGN PATENT DOCUMENTS

| | | |
|---|---|---|
| CN | 101186679 A | 5/2008 |
| CN | 101190961 A | 6/2008 |
| CN | 101338013 A | 1/2009 |
| CN | 101511893 A | 8/2009 |
| CN | 1882625 B | 8/2011 |
| CN | 102432787 A | 5/2012 |
| CN | 102131858 B | 6/2013 |
| DE | 10010668 A1 | 10/2001 |
| EP | 1445268 A1 | 8/2004 |
| EP | 2192597 A1 | 6/2010 |
| GB | 842414 A | 7/1960 |
| GB | 906219 | 9/1962 |
| GB | 1083013 A | 9/1967 |
| GB | 1532115 A | 11/1978 |
| GB | 2024833 A | 1/1980 |
| JP | 2004-238618 A | 8/2004 |
| JP | 2010-248435 A | 11/2010 |
| KR | 10-2006-0043671 A | 5/2006 |
| WO | 86/04075 A1 | 7/1986 |
| WO | 92/07047 A1 | 4/1992 |
| WO | 2004/055106 A2 | 7/2004 |
| WO | 2008030418 A1 | 3/2008 |
| WO | 2009/155747 A1 | 12/2009 |
| WO | 2009155747 A1 | 12/2009 |
| WO | 2011/069052 A2 | 6/2011 |
| WO | 2011/118147 A1 | 9/2011 |
| WO | 2012/141165 A1 | 10/2012 |
| WO | 2014040300 A1 | 3/2014 |

OTHER PUBLICATIONS

Anastasiu et al., "New Aspects in the technology and control alkylphenol production", Revista de Chimie 15: 71-75 (1964).
Dmitriev et al., "Theoretical bases for alkylation of phenols on cation-exchange resins", Obogashchenie Uglia i Khimicheskaia Pererabotka Topliva 24: 147-165 (1968).
Saha et al., "Alkylation of Phenol with Olefins in the Presence of Sulphuric Acid", Bangladesh J. Sci. Ind. Res. 44: 131-136 (2009).
"Cresol mixture of isomers: technical crude, ~85% (sum of isomers, GC)" Sigma Aldrich Catalogue (2017).

* cited by examiner

IN-SITU ALKYLPHENOL-ALDEHYDE RESINS

This application is a continuation of U.S. patent application Ser. No. 16/842,221, filed Apr. 7, 2020, which is a continuation of U.S. patent application Ser. No. 15/947,503, filed Apr. 6, 2018, now U.S. Pat. No. 10,647,806, which is a divisional of U.S. patent application Ser. No. 14/514,636, filed Oct. 15, 2014, now U.S. Pat. No. 9,944,744, which claims the benefit of priority of U.S. Provisional Patent Application Ser. No. 61/892,213, filed Oct. 17, 2013, all of which are hereby incorporated by reference in their entirety.

FIELD OF THE INVENTION

This invention generally relates to an in-situ process for preparing an alkylphenol-aldehyde resin and tackifier compositions and rubber compositions containing the alkylphenol-aldehyde resin formed from the in-situ process. The tackifier compositions and rubber compositions containing the alkylphenol-aldehyde resin prepared from the in-situ process show, inter alia, improved tack performance.

BACKGROUND

Rubber products are frequently made up of several rubber layers each with a same or a different chemical composition. During this "build up," the rubber layers must adhere to one another adequately in their pre-vulcanized state. For example, an assembled tire blank is required to hold together for a fairly long period prior to vulcanization. It is therefore important that the rubber mixtures used have an adequate "tack," the force required to pull apart two pre-vulcanized rubber mixtures which have been pressed together under certain defined conditions. While natural rubber mixtures generally have good tackiness, mixtures of synthetic rubbers are much less tacky and, in extreme cases, possess no tackiness at all. Therefore, it has been common practice to add a tackifier to less tacky rubbers or rubber mixtures to increase their tack. In synthetic rubber products, synthetic rubber adhesive compositions are employed to improve tack and provide good cured adhesion. Moreover, the rubber composition must not only have good initial tack, but also remain sufficiently tacky during the manufacturing process (i.e., good tack retention), even when the process is interrupted for fairly long periods, which is not unusual, particularly when manufacturing involves processes at different locations or requires storage and/or transport of pre-finished goods.

To ensure adequate tack, conventional methods of preparing alkylphenol-aldehyde resins typically use high-purity alkylphenols (e.g., commercially available resin-grade alkylphenols having a purity level of higher than about 98 wt %). However, using a purified alkylphenol is expensive and can significantly increased processing time and manufacturing costs.

Therefore, there remains a need to develop tackifiers which provide increased tack and tack retention, and, at the same time, also provide a cost-effective and time-efficient solution. A particular need exists in the tire industry because of the poor tack and tack retention of synthetic rubber compositions, such as commercial SBR-based tire compositions. This invention answers that need.

SUMMARY OF THE INVENTION

One aspect of the invention relates to an in-situ process for preparing an alkylphenol-aldehyde resin. The process comprises the step of providing a raw alkylphenol composition. The raw alkylphenol composition comprises one or more alkylphenol compounds and at least about 1 wt % phenol. Each alkylphenol compound has one or more alkyl substituents. The raw alkylphenol composition is reacted directly, without pre-purification, with one or more aldehydes to form an in-situ alkylphenol-aldehyde resin.

Another aspect of the invention relates to an alkylphenol-aldehyde resin prepared by reacting, without pre-purification, a raw alkylphenol composition directly with one or more aldehydes. The raw alkylphenol source comprises one or more alkylphenol compounds and at least about 1 wt % phenol. Each alkylphenol compound has one or more alkyl substituents.

Another aspect of this invention relates to a tackifier composition comprising the alkylphenol-aldehyde resin prepared by reacting, without pre-purification, a raw alkylphenol composition directly with one or more aldehydes. The raw alkylphenol source comprises one or more alkylphenol compounds and at least about 1 wt % phenol. Each alkylphenol compound has one or more alkyl substituents. The tackifier composition has improved tack performance, when used in a rubber composition.

Another aspect of this invention relates to a rubber composition comprising the alkylphenol-aldehyde resin prepared by reacting, without pre-purification, a raw alkylphenol composition directly with one or more aldehydes. The raw alkylphenol source comprises one or more alkylphenol compounds and at least about 1 wt % phenol. Each alkylphenol compound has one or more alkyl substituents. The rubber composition has improved tack performance.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

DETAILED DESCRIPTION OF THE INVENTION

Figure 1:
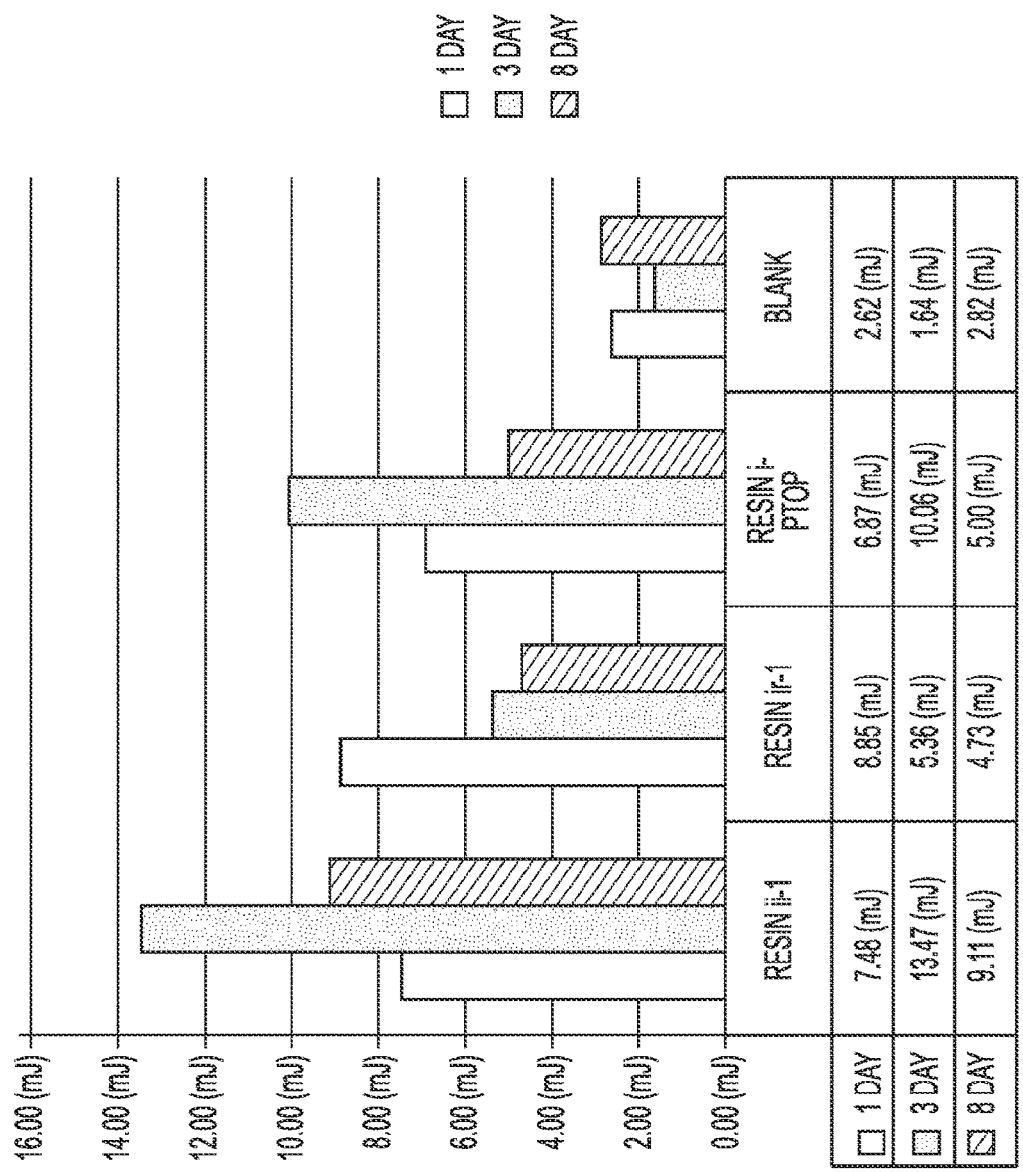
FIG. 1 shows the tack performance (tack and tack retention) of the rubber blends using the mixed in-situ resin prepared from a mixture of in-situ PTBP and in-situ PTOP (Resin ii-1), as compared to the tack performance of the rubber blends using in-situ PTOP resin (Resin i-PTOP), and the tack performance of the rubber blends using resins prepared from a mixture of in-situ PTOP and resin-grade PTBP (Resin it-1).

This invention relates to an in-situ process for preparing an alkylphenol-aldehyde resin, and tackifier compositions and rubber compositions containing the alkylphenol-aldehyde resin formed from the in-situ process. The in-situ process uses a raw alkylphenol composition and eliminates the need for a pre-purification of alkylphenol before reacting with an aldehyde. The resulting in-situ alkylphenol-aldehyde resin, when used in a tackifier composition, possesses a consistently improved tack and tack retention compared to a regular alkylphenol-aldehyde resin prepared from a purified alkylphenol.

In-Situ Preparation of an Alkylphenol-Aldehyde Resin

One aspect of the invention relates to an in-situ process for preparing an alkylphenol-aldehyde resin. The process comprises the step of providing a raw alkylphenol composition. The raw alkylphenol composition comprises one or more alkylphenol compounds and at least about 1 wt % phenol. Each alkylphenol compound has one or more alkyl substituents. The raw alkylphenol composition is reacted directly, without pre-purification, with one or more aldehydes to form an in-situ alkylphenol-aldehyde resin.

Suitable alkylphenol compounds for preparing the in-situ alkylphenol-aldehyde resin may have one or more alkyl groups in the ortho, meta, and/or para positions of the phenol. The alkyl group of the alkylphenol compounds may be a linear, branched, or cyclic alkyl containing 1 to 30 carbon atoms. Typically, the alkyl group contains 4 to 18 carbon atoms. Typical alkylphenol compositions includes at least one main alkylphenol component having at least one alkyl group at the para position of the phenol. Exemplary alkylphenols include para-methylphenol, para-tert-butylphenol (PTBP), para-sec-butylphenol, para-tert-hexylphenol, para-cyclohexylphenol, para-tert-octylphenol (PTOP), para-isooctylphenol, para-decylphenol, para-dodecylphenol, para-tetradecyl phenol, para-octadecylphenol, para-nonylphenol, para-pentadecylphenol, and para-cetylphenol.

The alkylphenol composition can be prepared in any suitable manner known in the art. One way to prepare the alkylphenol composition is through alkylation of phenol by directly reacting phenol with an alkylene. Various other methods of producing alkylphenol, including tert-butyl phenols, are disclosed in U.S. Pat. No. 4,166,191 and WO 2011/069052, which are hereby incorporated by reference in their entirety. Alternatively, the alkylphenol composition may be prepared by transalkylation of a crude alkylphenol with phenol. Various transalkylation reactions are disclosed in U.S. Pat. No. 5,399,786, which is hereby incorporated by reference in its entirety. Using the transalkylation of crude alkylphenol, a crude or residual alkylphenol can be recycled or recovered easily and reused directly as a reaction material for the in-situ process. This is particularly advantageous in the in-situ process, as the process does not require a pre-purification step for the alkylphenol composition before it is reacted with an aldehyde. Thus, this in-situ process promotes a cost-effective way in re-using alkylphenol crude.

Regardless the method used to prepare the alkylphenol composition, the raw alkylphenol composition, without further purification, contains some amount of impurity (more than a trace amount). It includes unreacted phenol and one or more side-product alkylphenols where the number of the alkyl groups on phenol varies, and/or where alkyl groups are at different positions of phenol, and/or where alkyl groups are in different isomeric forms. For instance, raw PTBP prepared by reacting isobutylene and phenol is typically a mixture containing not only PTBP, but also di-tert-butylphenol (e.g., 2, 4-di-tert-butylphenol or 2, 6-di-tert-butylphenol) and unreacted phenol, and may additionally contain ortho-tertbutylphenol and tri-tert-butylphenol (e.g., 2, 4, 6-tri-tert-butylphenol). For instance, raw PTOP prepared by reacting octene (e.g., diisobutylene) and phenol is typically a mixture containing not only PTOP, but also di-tert-octylphenol (e.g., 2, 4-di-tert-octylphenol or 2, 6-di-tert-octylphenol) and unreacted phenol, and may additionally contain ortho-tert-octylphenol and tri-tert-octylphenol (e.g., 2, 4, 6-tri-tert-octylphenol).

Conventional technology for preparing alkylphenol-aldehyde resin typically uses commercially available high-purity alkylphenol (e.g., resin-grade), or, if the alkylphenol compound is prepared directly from the olefin and phenol, it requires that the alkylphenol be distilled from the product mixture to obtain a purified alkylphenol before further usage. Typically, a high-purity alkylphenol composition (e.g., commercially available resin-grade) contains at least about 98 wt % or at least about 99 wt % the main alkylphenol component, and less than about 2 wt % or less than about 1 wt % phenol. For example, commercially available resin-grade PTBP contains at least 99.9 wt % PTBP and less than 0.1 wt % phenol; commercially available resin-grade PTOP contains at least 98 wt % PTOP and less than 2 wt % phenol.

The embodiments of the invention, however, require the use of an in-situ alkylphenol composition (i.e., a raw alkylphenol composition prepared, without further processing to obtain a purified alkylphenol component) to react directly with one or more aldehydes to form an in-situ alkylphenol-aldehyde resin. This process is also referred to as an "in-situ" preparation of alkylphenol-aldehyde resin. The raw, unpurified alkylphenol composition is referred to as an "in-situ" alkylphenol composition. The alkylphenol-aldehyde resin prepared by such in-situ alkylphenol composition and in-situ process is referred to as an "in-situ" alkylphenol-aldehyde resin.

The in-situ process uses a raw alkylphenol composition, and eliminates, or substantially reduces, the pre-purification of alkylphenol before further usage. When the raw alkylphenol composition contains one main alkylphenol component, this main alkylphenol component may be as low as about 50 wt %. For instance, the main alkylphenol component may range from about 50 wt % to about 99 wt %, from about 50 wt % to about 95 wt %, from about 50 wt % to about 90 wt %, from 50 wt % to about 85 wt %, or from about 75 wt % to about 85 wt %. The raw alkylphenol composition may contain at least about 1 wt % phenol. For instance, phenol may range from about 1 wt % to about 10 wt %, about 2 wt % to about 10 wt %, about 3 wt % to about 10 wt %, about 4 wt % to about 10 wt %, about 5 wt % to about 10 wt %, or about 6 wt % to about 8 wt %. The other side product alkylphenols may range from 0 to about 50 wt %, from about 5 wt % to about 50 wt %, for instance from about 7 wt % to about 18 wt %.

In one embodiment, the main alkylphenol component contained in the in-situ alkylphenol composition is PTBP. The in-situ alkylphenol composition comprises PTBP, phenol, di-tert-butylphenol, and optionally tri-tert-butylphenol and ortho-tert-butylphenol. In this in-situ PTBP composition, PTBP may range from about 50 wt % to about 99 wt % or from about 50 wt % to about 85 wt %, phenol may range from about 1 wt % to about 10 wt % or from about 5 wt % to about 10 wt %, di-tert-butylphenol may range from 0 to about 14 wt % or from about 7 wt % to about 14 wt %, ortho-tert-butylphenol may range from 0 to about 3 wt %, and tri-tert-butylphenol may range from 0 to about 1 wt %.

In one embodiment, the main alkylphenol component contained in the in-situ alkylphenol composition is PTOP. The in-situ alkylphenol composition comprises PTOP, phenol, di-tert-octylphenol, and optionally ortho-tert-octylphenol and tri-tert-octylphenol. In this in-situ PTOP composition, PTOP may range from about 50 wt % to about 99 wt % or from about 50 wt % to about 85 wt %, phenol may range from about 1 wt % to about 10 wt % or from about 5 wt % to about 10 wt %, di-tert-octylphenol may range from 0 to about 14 wt % or from about 7 wt % to about 14 wt %, ortho-tert-octylphenol may range from 0 to about 3 wt %, and tri-tert-octylphenol may range from 0 to about 1 wt %.

The in-situ process can also use a mixture of two or more different in-situ alkylphenol compositions, e.g., mixture of one raw alkylphenol composition (e.g., its main alkylphenol component is alkylphenol-1) and another raw alkylphenol composition (e.g., its main alkylphenol component is alkylphenol-2, wherein alkylphenol-2 is different from alkylphenol-1). Exemplary in-situ alkylphenol composition for preparing an alkylphenol-aldehyde resin includes a mixture of an in-situ PTBP composition and an in-situ PTOP composition. The ratio of the different in-situ alkylphenol compositions in the mixture can vary. For example, the ratio of in-situ PTBP to in-situ PTOP in a mixture can range from about 90:10 to about 10:90, from about 75:25 to about 25:75, from about 60:40 to about 40:60, from about 60:40 to about 50:50. An exemplary ratio of in-situ PTBP to in-situ PTOP in a mixture is about 58:42. The weight percentage ranges of the two or more main alkylphenol components, phenol, and other side-product alkylphenols in the mixture of the in-situ alkylphenol compositions can be proportionated from the ratios of the different in-situ alkylphenol compositions in the mixture.

The mixture of different in-situ alkylphenol compositions can be prepared by preparing different in-situ alkylphenol compositions separately and then mix them together. Alternatively, the mixture of different in-situ alkylphenol compositions can be prepared in a one-pot process. In this one-pot process, a mixture of different in-situ alkylphenol compositions can be prepared by reacting phenol with a first alkyl compound to form the first in-situ alkylphenol, and subsequently adding a second alkyl compound to form the second in-situ alkylphenol; different alkyl compounds can be subsequently added into the existing mixture of in-situ alkylphenol composition in this one-pot process, if additional in-situ alkylphenols are desired in the mixture. The sequence of adding different alkyl compounds can change. For example, a mixture of in-situ PTBP and in-situ PTOP can be prepared by one-pot synthesis by reacting phenol with isobutylene first to produce in-situ PTBP, and then adding diisobutylene into the reaction mixture to additionally produce in-situ PTOP, or vise versa. The additions of alkyl compounds can also be simultaneous rather than sequential, i.e., when preparing the mixture of different in-situ alkylphenol compositions in the one-pot process, two or more different alkyl compounds or all different alkyl compounds can be added simultaneously.

The in-situ process can also use a mixture of an in-situ alkylphenol composition and a purified alkylphenol composition to prepare in-situ alkylphenol-aldehyde resins. The in-situ alkylphenol composition may contain a same or different main alkylphenol component than the purified alkylphenol composition. Exemplary in-situ alkylphenol composition for preparing an alkylphenol-aldehyde resin includes a mixture of an in-situ PTBP composition and a purified PTOP composition, or a mixture of an in-situ PTOP composition and a purified PTBP composition.

After the in-situ alkylphenol composition is obtained, it is then directly reacted, without purification, with one or more aldehydes to generate an in-situ alkylphenol-aldehyde resin. Without being bound by theory, the in-situ alkylphenol composition containing a mixture of side-product alkylphenols that promote the incorporation of more aldehyde into the alkylphenol-aldehyde resin and can increase the molecular weight of the formed alkylphenol-aldehyde resin, resulting a higher melt point which typically contributes to a better tack performance when the resin is used in a tack composition. Increased tack performance herein can refer to initial tack, long term (aged) tack (or tack retention), or both. The improvement in aged tack (or tack retention) of a tackifier composition or rubber composition is particularly desirable, as it is often required that the tackifier composition remain sufficiently tacky over a fairly long period; it is not unusual that manufacture processes of goods containing the tackifier composition to be interrupted for fairly long periods when involving processes at different locations or involving storage and/or transportation of pre-finished goods. Moreover, the need for additional adhesive compositions to improve tack retention can be eliminated when using the in-situ alkylphenol-aldehyde resin, thereby reducing cost.

Figure 2:
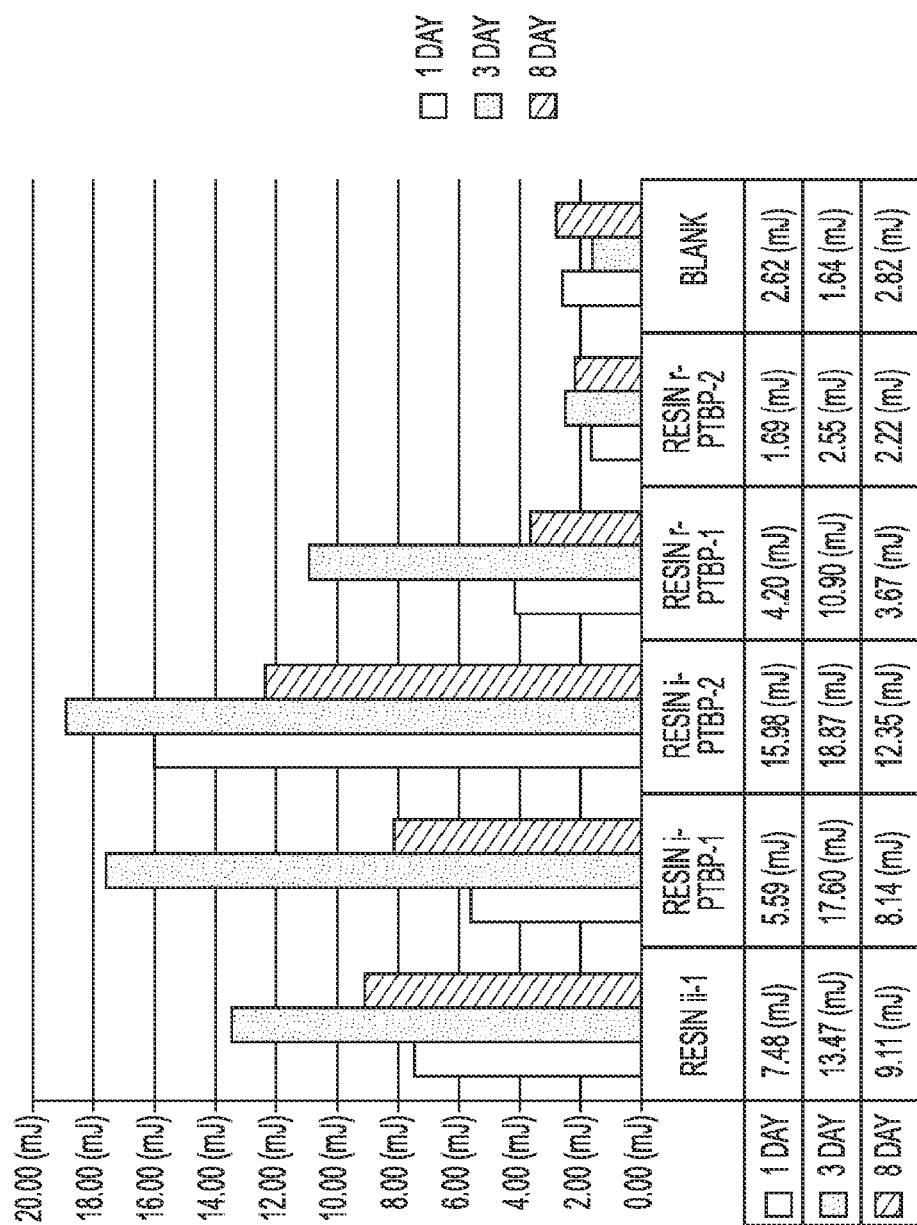
FIG. 2 shows the tack performance (tack and tack retention) of the rubber blends using the two in-situ PTBP resins having different melting points (Resin i-PTBP-1 and Resin i-PTBP-2), as compared to the tack performance of the rubber blends using corresponding resin-grade PTBP resin (Resin r-PTBP-1 and Resin r-PTBP-2), and the tack performance of the rubber blends using resins prepared from a mixture of in-situ PTOP and in-situ PTBP (Resin ii-1).

The tack of the formed in-situ alkylphenol-aldehyde resin, when used in a rubber composition, typically can increase about 10% or more, about 30% or more, about 50% or more, about 60% or more, about 200% or more, about 300% or more, about 500% or more, or about 800% or more, compared to an alkylphenol-aldehyde resin prepared from a purified alkylphenol. For instance, FIG. 2 shows that the tack of the formed in-situ alkylphenol-aldehyde resin in a rubber composition can increase about 30% or more (Resin i-PTBP-1 v. Resin r-PTBP-1 at Day 1), or about 800% or more (Resin i-PTBP-2 v. Resin r-PTBP-2 at Day 1).

The tack retention of the formed in-situ alkylphenol-aldehyde resin, when used in a rubber composition, typically can increase about 40% or more, about 60% or more, about 120% or more, about 200% or more, about 300% or more, about 500% or more, or about 600% or more, compared to an alkylphenol-aldehyde resin prepared from a purified alkylphenol. For instance, FIG. 2 shows that the tack retention (after 3 days or 8 days) of the formed in-situ alkylphenol-aldehyde resin in a rubber composition can increase about 60% or more (Resin i-PTBP-1 v. Resin r-PTBP-1 at Day 3), about 120% or more (Resin i-PTBP-2 v. Resin r-PTBP-2 at Day 8), about 400% or more (Resin i-PTBP-1 v. Resin r-PTBP-1 at Day 8), or about 600% or more (Resin i-PTBP-1 v. Resin r-PTBP-1 at Day 3).

The tack performance comparisons of the in-situ alkylphenol-aldehyde resins with regular alkylphenol-aldehyde resins are made keeping all conditions or compositions the same, or substantially the same, except that the regular alkylphenol-aldehyde resin is prepared from a purified alkylphenol. The purified alkylphenol used in the comparisons typically refers to a high-purity alkylphenol composition (e.g., commercially available resin-grade) containing at least about 98 wt % or at least about 99 wt % the main alkylphenol component, and less than about 2 wt % or less than about 1 wt % phenol. For example, commercially available resin-grade PTBP contains at least 99.9 wt %

PTBP and less than 0.1 wt % phenol; commercially available resin-grade PTOP contains at least 98 wt % PTOP and less than 2 wt % phenol.

The in-situ alklyphenol-aldehyde resins prepared from a mixture of different in-situ alkylphenol compositions have also shown better tack and tack retention, when used in a rubber composition, than a regular alklyphenol-aldehyde resin prepared from a mixture of purified alkylphenol compositions or a mixture of purified alkylphenol composition and in-situ alkylphenol composition. For instance, FIG. 1 shows that the tack retention of the formed mixture of in-situ alklyphenol-aldehyde resin, when used in a rubber composition, can increase about 90% or more (Resin ii-1 v. Resin it-1 at Day 8), or about 150% or more (Resin ii-1 v. Resin it-1 at Day 3) than an alklyphenol-aldehyde resin prepared from a mixture of purified alkylphenol composition and in-situ alkylphenol composition.

Any aldehyde known in the art for preparing an alkylphenol-aldehyde resin is suitable in the in-situ process. Exemplary aldehydes include formaldehyde, methylformcel, butylformcel, acetaldehyde, propionaldehyde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldehyde, and acetals, and mixtures thereof. A typical aldehyde used is formaldehyde.

The reaction of alkylphenols with aldehyde to prepare alkylphenol-aldehyde resins is known in the art. The type of catalyst and the molar ratio of the reactants used in reaction determines the molecular structure and physical properties of the resins. A typical acid catalyst used is p-toluene sulfonic acid or dodecylbenzensulfonic acid. An aldehyde:phenol ratio between 0.5:1 and 1:0.1 (typically 0.5:1 to 0.8:1) with an acid catalyst typically generates novolak resins, which are thermoplastic in character. A higher aldehyde:phenol ratio (e.g., more than 1:1 to 3:1) with a basic catalyst typically give rise to resole resins, which are characterized by their ability to be thermally hardened at elevated temperatures.

The process of reacting an in-situ alkylphenol composition with one or more aldehydes can be used to prepare novolak resins, following any suitable process for preparing novolak resins known in the art. For instance, an in-situ alkylphenol composition can be directly reacted, without pre-purification, with one or more aldehydes in the presence of a catalyst (e.g. an acid catalyst) to form a novolak resin. An additional aldehyde may be added later before the final product is neutralized to adjust the desirable melt point of the resin. Suitable acid catalysts for preparing novolak resins include ethanesulfonic acid, benzenesulfonic acid, benzenedisulfonic acid, chlorobenzenesulfonic acid, 3,4-dichlorobenzene sulfonic acid, cresolsulfonic acids, phenol sulfonic acids, toluenesulfonic acids, xylenesulfonic acids, octylphenolsulfonic acid, naphthalenesulfonic acid, 1-naphthol-4-sulfonic acid, dodecylsulfonic acid, dodecylbenzensulfonic acid, and oxalic acid. A further description of the process for preparing novolak resins can be found in U.S. Pat. Nos. 8,030,418 and 8,470,930, which are hereby incorporated by reference in their entirety.

The process of reacting an in-situ alkylphenol composition with an aldehyde can also be used to prepare resole resins, following any suitable process for preparing resole resins known in the art. For instance, an in-situ alkylphenol composition can be directly reacted, without pre-purification, with one or more aldehydes in the presence of a base, as a basic catalyst, or for base modification of the resulting resins. Suitable bases for preparing resole resins include ammonium hydroxide; tertiary amines such as triethylamine, triethanolamine, diethyl cyclohexyl amine, triisobutyl amine; and alkali and alkaline earth metal oxides and hydroxides. Alternatively, an in-situ alkylphenol composition can be directly reacted, without pre-purification, with one or more aldehydes in the presence of an acid catalyst to form a novolak resin first. Then, the novolak resin can be further reacted with one or more aldehydes under basic conditions to form a resole resin.

The resulting in-situ alklyphenol-aldehyde resins can be modified with one or more bases. Suitable bases are typically primary or secondary amines having a formula of NHR'R", wherein R' and R" are independently H, $C_1$-$C_6$ alkyl, $C_2$-$C_6$ alkenyl, $C_2$-$C_6$ alkynyl, aryl, hydroxyl $C_1$-$C_6$ alkyl, carboxy $C_1$-$C_6$ alkyl, or R' and R" together form a 5- to 7-membered nitrogenous heterocyclic ring. Exemplary amines include mono and di-amino alkanes and their substituted analogs, e.g., ethylamine, dimethylamine, dimethylaminopropyl amine and diethanol amine; aryl amines and diamines, e.g., aniline, naphthylamine, benzyl amine, phenylene diamine, diamino naphthalenes; heterocyclic amines, e.g., morpholine, pyrrole, pyrrolidine, imidazole, imidazolidine, and piperidine; melamine and their substituted analogs. Other representative amines are alkylene polyamine, including ethylene polyamines which can be formed from reactants such as ethylenediamine, diethylene triamine, triethylene tetramine, tetraethylene pentamine, pentaethylene hexamine, hexaethylene heptamine, heptaethylene octamine, octaethylene nonamine, nonaethylene decamine, decaethylene undecamine and mixtures of such amines having nitrogen contents corresponding to the alkylene polyamines; and propylene polyamines which can be formed from reactants such as propylene diamine and di-, tri-, tetra-, penta-propylene tri-, tetra-, penta-, and hexa-amines. A further description of the process for preparing base-modified alklyphenol-aldehyde resins can be found in U.S. Pat. No. 8,030,418, which is hereby incorporated by reference in its entirety. A typical base used is morpholine.

To allow adequate reaction of the in-situ alkylphenol composition with one or more aldehydes, xylene can be added in the reaction system, in a small amount, to keep the viscosity of the reaction mixture low and to keep the reaction product at a lower temperature until neutralization can be conducted. Other aliphatic (including cycloaliphatic) or aromatic, non-reactive organic solvent that has low-viscosity can also be used, such as toluene, benzene, naphthalene, nonane, octane, petroleum fractions, and the like.

After the in-situ alklyphenol-aldehyde resins are modified with one or more bases, the base-modified alkylphenol-aldehyde resin can be further reacted with an epoxide or other chemical reagents to stabilize the basic moiety or other reactive moieties in the modified resin. A detailed process for stabilizing a base-modified alkylphenol-aldehyde resin with an epoxide can be found in U.S. Pat. No. 8,030,418, which is hereby incorporated by reference in its entirety. The hydroxyl functionality remaining on the alkylphenol-aldehyde resin can also react with the epoxide too. Exemplary epoxide includes an epoxide of $C_4$-$C_{60}$ α-olefin, for instance, a straight chain $C_4$-$C_{22}$ epoxide, or a straight chain $C_6$-$C_{16}$ epoxide.

An exemplary embodiment includes reacting an amine-modified in-situ alkylphenol-aldehyde resin with an epoxide or a chemical reagent for stabilizing the amine moiety in the alkylphenol-aldehyde resin. A typical amine used is morpholine.

Stabilization of Base-Modified Alkylphenol-Aldehyde Resin with a Salicylic Acid

When preparing a base-modified alkylphenol-aldehyde resin, the in-situ process may further comprise the step of reacting the base-modified alkylphenol-aldehyde resin with a salicylic acid. Typically, a base-modified alkylphenol-aldehyde resin needs to be reacted with an epoxide or other chemical reagents to stabilize the basic moiety or other reactive moieties in the modified resin. A detailed process for stabilizing a base-modified alkylphenol-aldehyde resin with an epoxide can be found in U.S. Pat. No. 8,030,418, which is hereby incorporated by reference in its entirety. The hydroxyl functionality remaining on the alkylphenol-aldehyde resin reacts with the epoxide too. Exemplary epoxide includes an epoxide of $C_4$-$C_{60}$ α-olefin, for instance, a straight chain $C_4$-$C_{22}$ epoxide, or a straight chain $C_6$-$C_{16}$ epoxide.

Using a salicylic acid in the process can eliminate the need to use an epoxide or other chemical reagents for stabilizing the basic moiety, thus providing a cost-effective alternative for stabilizing the base-modified alkylphenol-aldehyde resin. The salicylic acid acts to stabilize the final resin by neutralizing any base such as amine (e.g., morpholine) released. This is done by forming a salt that plasticizes the resin, consequently diminishing the effects of molecular weight buildup by the decomposition of salicylic acid to phenol. Thus, the base-modified alkylphenol-aldehyde resin prepared by in-situ process, after reacting with a salicylic acid, can be completely stabilized without using an epoxide or any other chemical reagents for stabilizing the basic moiety.

The salicylic acid can be added to reaction system before or after the base-modification reaction. The reactions may be carried out sequentially or simultaneously in a one-pot reaction vessel, or as separate reactions isolating each or a desired intermediate product. The modification and stabilization process are carried out in a reactor, for example a customary vessel or glass flask which is equipped with a stirrer, heater, thermostat, feeding device, reflux condenser and water separator.

Suitable salicylic acids include salicylic acid, its structural derivatives, or mixtures thereof. A structural derivative of salicylic acid refers to a salicylic acid with one or more hydrogens on the phenol group of the salicylic acid being substituted with one or more substituents, The one or more substituents can be alkyl, alkoxy, phenyl or substituted phenyl, alkenyl, halo, or acetyl. A detailed list of structural derivatives of salicylic acid, and the process of making them may be found in U.S. Pat. Nos. 4,131,618 and 5,734,078, which are hereby incorporated by reference in their entirety. Typically, salicylic acid, alkyl salicylic acid (such as salicylic acid with one or more $C_1$-$C_4$ alkyl groups substituted on the phenol group of the salicylic acid; e.g., 3,5-di-tert-butylsalicylic acid), alkoxy salicylic acid (such as salicylic acid with one or more $C_1$-$C_4$ alkoxy groups substituted on the phenol group of the salicylic acid), acetylsalicylic acid, or combinations thereof, are used.

A further description of the process for preparing base-modified alkylphenol-aldehyde resin with improved stability with a salicylic acid may be found in U.S. Provisional Application, entitled "Modified Alkylphenol-Aldehyde Resins Stabilized by a Salicylic Acid," filed on Aug. 29, 2013, which is hereby incorporated by reference in its entirety.

In-Situ Alkylphenol-Aldehyde Resin and its Use in Tackfier Composition/Rubber Composition Another aspect of the invention relates to an alkylphenol-aldehyde resin prepared by reacting, without pre-purification, a raw alkylphenol composition directly with one or more aldehydes. The raw alkylphenol source comprises one or more alkylphenol compounds and at least about 1 wt % phenol. Each alkylphenol compound has one or more alkyl substituents.

The in-situ alkylphenol-aldehyde resins includes resins resulted from all the above embodiments of the in-situ process in preparing an in-situ alkylphenol-aldehyde resin.

The resulting in-situ alkylphenol-aldehyde resin can be a novolak type resin, as well as a resole type resin or a base-modified resole resin, depending on the manner in preparing the in-situ alkylphenol-aldehyde resin, as discussed in the above embodiments of the in-situ process.

The resulting in-situ alkylphenol-aldehyde resin can also be mixed with alkylphenol-aldehyde resins prepared from pure alkylphenol, including a pure alkylphenol composition or a alkylphenol composition containing mixture of different pure alkylphenols.

Another aspect of this invention relates to a tackifier composition comprising the alkylphenol-aldehyde resin prepared by reacting, without pre-purification, a raw alkylphenol composition directly with one or more aldehydes. The raw alkylphenol source comprises one or more alkylphenol compounds and at least about 1 wt % phenol. Each alkylphenol compound has one or more alkyl substituents. The tackifier composition has improved tack performance.

The in-situ alkylphenol-aldehyde resins prepared from the in-situ alkylphenol composition are useful to improve tack and tack retention, when used in a tackifier composition. The tackifier composition comprising the in-situ alkylphenol-aldehyde resin has consistently shown enhanced tack performance compared to the same tackifier composition comprising a regular alkylphenol-aldehyde resin prepared from a purified alkylphenol composition.

The tackifier composition may further comprise alkylphenol-aldehyde resins prepared from pure alkylphenol, including a pure alkylphenol composition or a alkylphenol composition containing mixture of different pure alkylphenols.

Another aspect of this invention relates to a rubber composition comprising the alkylphenol-aldehyde resin prepared by reacting, without pre-purification, a raw alkylphenol composition directly with one or more aldehydes. The raw alkylphenol source comprises one or more alkylphenol compounds and at least about 1 wt % phenol. Each alkylphenol compound has one or more alkyl substituents. The rubber composition has improved tack performance. The rubber composition has also improved processing performance.

The in-situ alkylphenol-aldehyde resins prepared from the in-situ alkylphenol composition are useful to improve tack and tack retention in a rubber composition. The rubber composition comprising the in-situ alkylphenol-aldehyde resin has consistently shown enhanced tack performance compared to the same rubber composition comprising a regular alkylphenol-aldehyde resin prepared from a purified alkylphenol composition.

The in-situ alkylphenol-aldehyde resins prepared from the in-situ alkylphenol composition are also useful to improve the processing performance of a rubber composition. The rubber composition comprising the in-situ alkylphenol-aldehyde resin has consistently shown enhanced processing performance compared to the same rubber composition comprising a regular alkylphenol-aldehyde resin prepared from a purified alkylphenol composition.

A parameter to measure the processing performance (the performance of rubber mixing process) of a rubber composition is viscosity. Heterogenous nature of rubber compounds, strong interaction between various components, and viscoelastic nature of elastomers and flow behavior of such complex materials make the processing of rubber compounds complex. If the viscosity of the rubber composition is too low, it does not help with dispersing the additives such as fillers; on other than hand, if the viscosity of the rubber composition is too high, the rubber composition becomes very stiff, makes the mixing process difficult and energy consuming. Controlling the amount of the in-situ alkylphenol-aldehyde resins, the individual component and the relative concentration of the components in the in-situ alkylphenol-aldehyde resins in the rubber composition can modulate the viscosity of the rubber composition, thus modulating the processibility of the rubber composition. Typically, the mooney viscosity is less than 100, or 80 for properly processing the rubber.

The rubber composition may further comprise alkylphenol-aldehyde resins prepared from pure alkylphenol, including a pure alkylphenol composition or a alkylphenol composition containing mixture of different pure alkylphenols.

The rubber composition comprises, besides the in-situ alkylphenol-aldehyde resin, one or more rubber compounds. The rubber compound includes a natural rubber, a synthetic rubber, or a mixture thereof. For instance, the rubber composition is a natural rubber composition.

Alternatively, the rubber composition can be a synthetic rubber composition. Representative synthetic rubbery polymers include diene-based synthetic rubbers, such as homopolymers of conjugated diene monomers, and copolymers and terpolymers of the conjugated diene monomers with monovinyl aromatic monomers and trienes. Exemplary diene-based compounds include, but are not limited to, polyisoprene such as 1,4-cis-polyisoprene and 3,4-polyisoprene; neoprene; polystyrene; polybutadiene; 1,2-vinyl-polybutadiene; butadiene-isoprene copolymer; butadiene-isoprene-styrene terpolymer; isoprene-styrene copolymer; styrene/isoprene/butadiene copolymers; styrene/isoprene copolymers; emulsion styrene-butadiene copolymer; solution styrene/butadiene copolymers; butyl rubber such as isobutylene rubber; ethylene/propylene copolymers such as ethylene propylene diene monomer (EPDM); and blends thereof. A rubber component, having a branched structure formed by use of a polyfunctional modifier such as tin tetrachloride, or a multifunctional monomer such as divinyl benzene, may also be used. Additional suitable rubber compounds include nitrile rubber, acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers such as chloroprene rubbers, chlorosulfonated polyethylene rubbers, hydrogenated nitrile rubber, hydrogenated isoprene-isobutylene rubbers, tetrafluoroethylene-propylene rubbers, and blends thereof.

The rubber composition can also be a blend of natural rubber with a synthetic rubber, a blend of different synthetic rubbers, or a blend of natural rubber with different synthetic rubbers. For instance, the rubber composition can be a natural rubber/polybutadiene rubber blend, a styrene butadiene rubber-based blend, such as a styrene butadiene rubber/natural rubber blend, or a styrene butadiene rubber/butadiene rubber blend. When using a blend of rubber compounds, the blend ratio between different natural or synthetic rubbers can be flexible, depending on the properties desired for the rubber blend composition.

The in-situ alkylphenol-aldehyde resin may be added to a rubber composition in the same amount, in the same manner and for the same uses as other known tackifers. In one embodiment, in-situ alkylphenol-aldehyde resin is used in an amount ranging from about 0.1 per hundred rubber (phr) to 10 phr, for instance, from about 0.5 phr to 10 phr, from about 1 phr to about 7 phr, from about 2 phr to about 6 phr, or from about 1 phr to about 5 phr.

Also, the rubber composition may comprise additional materials, such as a methylene donor, one or more additives, one or more reinforcing materials, and one or more oils. As known to the skilled in the art, these additional materials are selected and commonly used in conventional amounts.

Suitable methylene donors include, for instance, hexamethylenetetramine (HMTA), di-, tri-, tetra-, penta-, or hexa-N-methylol-melamine or their partially or completely etherified or esterified derivatives, for example hexamethoxymethylmelamine (HMMM), oxazolidine or N-methyl-1,3,5-dioxazine, and mixtures thereof.

Suitable additives include, for instance, sulfur, carbon black, zinc oxides, silica, waxes, antioxidant, antiozonants, peptizing agents, fatty acids, stearates, accelerators, curing agents, activators, retarders, a cobalt, adhesion promoters, resins such as tackifying resins, plasticizers, pigments, additional fillers, and mixtures thereof.

Suitable reinforcing materials include, for instance, nylon, rayon, polyester, aramid, glass, steel (brass, zinc or bronze plated), or other organic and inorganic compositions. These reinforcing materials may be in the form of, for instance, filaments, fibers, cords or fabrics.

Suitable oils include, for instance, mineral oils and naturally derived oils. Examples of naturally derived oils include tall oil, linseed oil, and/or twig oil. Commercial examples of tall oil include, e.g., SYLFAT® FA-1 (Arizona Chemicals) and PAMAK 4® (Hercules Inc.). The one or more oils may be contained in the rubber composition, relative to the total weight of rubber compounds in the composition, less than about 5 wt %, for instance, less than about 2 wt %, less than about 1 wt %, less than about 0.6 wt %, less than about 0.4 wt %, less than about 0.3 wt %, or less than about 0.2 wt %. The presence of an oil in the rubber composition may aid in providing improved flexibility of the rubber composition after vulcanization.

The rubber compositions can be vulcanized by using mixing equipment and procedures conventionally employed in the art. Likewise, the final rubber products can be fabricated by using standard rubber curing techniques. The reinforced rubber compounds can be cured in a conventional manner with known vulcanizing agents at about 0.1 to 10 phr. A general disclosure of suitable vulcanizing agents may be found in Kirk-Othmer, Encyclopedia of Chemical Technology (3rd ed., Wiley, New York, 1982) vol. 20, pp. 365 to 468 (particularly "Vulcanization Agents and Auxiliary Materials," pp. 390 to 402), and Vulcanization by A. Y. Coran, Encyclopedia of Polymer Science and Engineering (2nd ed., John Wiley & Sons, Inc. 1989), both of which are incorporated herein by reference. Vulcanizing agents can be used alone or in combination.

The rubber compositions containing the in-situ alkylphenol-aldehyde resin exhibit significantly enhanced initial tack and tack retention, and thus can be useful to make a wide variety of products, for instance, tires or tire components such as sidewall, tread (or treadstock, subtread), carcass ply, body ply skim, wirecoat, beadfiller, or overlay compounds for tires. Suitable products also include hoses, power belts, conveyor belts, printing rolls, rubber shoe heels, rubber shoe soles, rubber wringers, automobile floor mats, mud flaps for trucks, ball mill liners, and weather strips.

EXAMPLES

The following examples are given as particular embodiments of the invention and to demonstrate the practice and advantages thereof. It is to be understood that the examples are given by way of illustration and are not intended to limit the specification or the claims that follow in any manner.

Example 1: Preparation of In-Situ Para-Tert-Butylphenol (PTBP) Via Isobutylene and Phenol A 2-liter autoclave was charge with phenol (707.8 grams) and Amberlyst® 15 (Dow, MI) (57.0 grams). The reactor was heated to 90-100° C. The reactor was pressure-checked with nitrogen by venting and purging with nitrogen at 200 psi. The reactor was heated to 95° C., and, when the reactor temperature was stable, isobutylene (415.6 grams) was added to the reactor at a controlled rate to ensure the reactor temperature does not exceed 100° C. Once the addition of isobutylene was completed, the reaction was maintained at 95° C. for 2 hours, and the reaction mixture was sampled by the gas chromatography (GC) analysis. The reaction was considered complete when the difference of a component in the sample compared to that in the previous sample was within 0.5 wt % for all reaction components.

A typical product composition of in-situ PTBP prepared via isobutylene and phenol is shown in Table 1.

TABLE 1

A Typical Product Composition of In-Situ PTBP Prepared via Isobutylene and Phenol

| | |
|---|---|
| Phenol (wt %) | 6.00-8.00 |
| Butylphenol (wt %) | >75.0 |
| Dialkylated phenol (wt %) | <15.0 |
| 2,4,6-Tri-Tert-Butylphenol (wt %) | <0.5 |
| Water by Karl Fisher [a] | <1000 ppm |

[a] The amount of water was determined by Karl Fischer titration, which is a classic titration method in analytical chemistry that uses coulometric or volumetric titration to determine trace amounts of water in a sample.

Example 2: Preparation of In-Situ Para-Tert-Butylphenol (PTBP) Via Transalkylation of PTBP Crude with Phenol A 2-liter flask was charged with PTBP crude (620 grams), phenol (380 grams) and Amberlyst® 15 (50 grams). The reaction was heated to 95° C., and the temperature was maintained at 95° C. for 2 hours. The reaction mixture was sampled every hour. The reaction was considered complete when the difference of a component in the sample compared to that in the previous sample was within 0.5 wt % for all reaction components.

A typical product composition of in-situ PTBP prepared via transalkylation of PTBP crude with phenol is shown in Table 2.

TABLE 2

A Typical Product Composition of In-Situ PTBP prepared via Transalkylation of PTBP Crude with Phenol

| | |
|---|---|
| Phenol (wt %) | 6.00-8.00 |
| Butylphenol (wt %) | >75.0 |
| Dialkylated phenol (wt %) | <15.0 |
| 2,4,6-Tri-Tert-Butylphenol (wt %) | <0.5 |
| Water by Karl Fisher [a] | <1000 ppm |

[a] The amount of water was determined by Karl Fischer titration, which is a classic titration method in analytical chemistry that uses coulometric or volumetric titration to determine trace amounts of water in a sample.

The composition of the PTBP crude varies. The amount of each component in the PTBP crude can be calculated and adjusted accordingly to achieve a desired isobutylene/phenol mole ratio in the in-situ PTBP product.

Example 3: Preparation of In-Situ Mixture of Alkylphenols (PTBP and Para-Tert-Octylphenol (PTOP))

A 2-liter flask was charged with Amberlyst® 15 (45.2 grams) and phenol (1000 grams). The temperature of reactor was set to 80° C. and the agitation was turned on. Isobutylene (380.2 grams) was added over a period of 1.5-2 hours. Diisobutylene (420.8 grams) was then added over a period of 6-8 hours. After the additions were complete, the mixture was then allowed to equilibrate for 1-2 hours. After another one hour, the batch was sampled for analysis. Once the reaction product was determined to be within specifications, the product was transferred as soon as possible to a storage vessel.

The typical weight ratios of different reagents in a standard load is shown in Table 3, and a typical product assay is shown in Table 4.

TABLE 3

Weight Ratios of Reagents in a Standard Load

| | |
|---|---|
| Amberlyst ® 15 CATALYST | 4.52 |
| Phenol | 100.00 |
| Diisobutylene | 42.83 |
| Isobutylene | 38.20 |

TABLE 4

Typical Product Assay Showing Products in Weight Ratios

| | |
|---|---|
| DiTOP | 5.12 |
| Light Ends | 0.20 |
| Phenol | 1.58 |
| PTBP | 57.76 |
| PTOP including two isomers | 32.98 |
| 2,4-DiTOP | 4.20 |

Example 4: Preparation of Alkylphenol-Aldehyde Resin from Mixed In-Situ Alkylphenol (In-Situ PTOP and In-Situ PTBP) (Resin ii-1)

The resin kettle was set for reflux return, and water (600 kg, 33.3 kilomoles) was loaded to the azeo receiver. Molten mixture of in-situ PTBP and in-situ PTOP (42,000 kg, 241.4 kilomoles) was pumped to the kettle with the agitator turned on after 1000 kg of the molten mixture was loaded. When all in-situ monomers were loaded, xylene (1000 kg, 9.4 kilomoles) was charged to the reactor. Dodecylbenzene sulfonic acid (60 kg, 0.19 kilomoles) was then transferred into the resin kettle and mixed with the molten in-situ monomer solution. The batch temperature was then adjusted to 125-130° C., and the kettle was set for reaction distillation which would send the overhead condensation liquid into the azeo receiver, as described in the next step when formaldehyde would be added. The overhead condensation liquid would contain water, xylene, unreacted formaldehyde and some phenolic compounds. The azeo would fill with xylene accumulating as the top layer which could return to the kettle. The bottom layer would contain mostly water and would be drawn off from the azeo receiver, and sent to a collection tank during the process.

Using a subsurface addition system, 50% aqueous formaldehyde (12,600 kg, 210 kilomoles) was metered into the reaction batch at a sufficiently slow rate to establish an exotherm; once the exotherm was established, the addition rate was increased until ⅝ths of the formaldehyde was added. The addition rate was decreased to maintain reaction efficiency as the condensation product viscosity increased. Throughout the addition of the formaldehyde, the batch temperature was maintained at 125-135° C. The level of unreacted formaldehyde in the overhead stream could be monitored during the course of the reaction. After the formaldehyde addition was completed, the product melt point was estimated using a vacuum-oven melt point technique. The target melt point was 125-130° C. If the melt point is low, formaldehyde can be added to increase the melt point. When the melt point of the product reached the desired range, the product was neutralized by adding 85% triethanolamine (45 kg 0.30 kilomoles).

The resin kettle was then set for total distillation, and the reactor was heated under atmospheric pressure to 160° C. Once the temperature reached 160° C., full vacuum was applied slowly, and the reaction batch was distilled under vacuum to 170-180° C., and this condition was held for 15 minutes. After 15 minutes, the melt point was checked with a ring-and-ball test. When the melt point of the product reached the desired specification, the molten resin was transferred to a cooling system for final packing as solid resin flakes or pastilles (42,250 kg, 95% yield).

Characterization of the product in this example: Softening point specification: 120-140° C. (e.g., lot 2201-198: 132.8° C.); Gel permeation chromatography (GPC): Molecular Weight (Mw) was 1450-2175, Number Average Molecular Weight (Mn) was 910-1380; Differential Scanning calorimetry (DSC): Glass transition Temperatures ($T_g$) was 90-95° C.; Fourier Transform Infrared Spectroscopy (FTIR): 3227 $cm^{-1}$ (50% T, broad), 2956 $cm^{-1}$ (20% T, sharp), 1755 $cm^{-1}$ (80% T, broad), 1605 $cm^{-1}$ (75% T, broad), 1485 $cm^{-1}$ (30% T, sharp), 1363 $cm^{-1}$ (45% T, sharp), 1205 $cm^{-1}$ (45% T, sharp), 1125 $cm^{-1}$ (67% T, sharp), 875 $cm^{-1}$ (75% T sharp), 819 $cm^{-1}$ (65% T, sharp). Weight % free monomers in resin: 0.05-0.3% xylene, 0.05-0.5% PTBP, 0.3-1.0% PTOP. Melt viscosity at 180° C. was 900-1000 cPs. Acid number was 24-55.

The resin prepared by this method presented excellent thermal stability even after 30 hours at 180° C.

Example 5: Preparation of Alkylphenol-Aldehyde Resin from Mixed In-Situ Alkylphenol (In-Situ PTOP and In-Situ PTBP) (Resin ii-2)

Following the same reaction procedures as described in Example 4, a higher melt-point resin was prepared where the target ball and ring melt point of the desired product was ranging from 130° C. to 140° C., for instance, 135° C. When the melt point of the product reached the desired specification (i.e., a ball and ring softening point of at least 130-140° C., for instance, 135° C.), the molten resin was transferred to a cooling system for final packing as solid resin flakes or pastilles (42,362 kg, 95% yield).

Example 6: Preparation of Alkylphenol-Aldehyde Resin from Mixed In-Situ Alkylphenol (In-Situ PTOP and In-Situ PTBP) (Resin ii-3)

Using the same reaction procedures as described in Example 4, a higher melt point resin was prepared where the target ball and ring melt point of the desired product was ranging from 135 to 145° C., for instance, 140° C. With the melt point of the product reached the desired specification (i.e., a ball-and-ring softening point of at least 135-145° C., for instance, 140° C.), the molten resin was transferred to a cooling system for final packing as solid resin flakes or pastilles (42,630 kg, 95% yield).

Example 7: Tack Application Testing for Alkylphenol-Aldehyde Resin Prepared from Mixed In-Situ Alkylphenol Composition In-situ alkylphenol-aldehyde resins prepared from mixed in-situ alkylphenol composition according to Example 4 was blended in a 60/40 natural rubber/polybutadiene (NR/PBD) rubber blend at 4 phr, and the resulted rubber blended were tested for tack performance. The tack results are shown in FIG. 1.

FIG. 1 shows the tack performance (tack and tack retention) of the rubber blends using the mixed in-situ resin prepared from a mixture of in-situ PTBP and in-situ PTOP (Resin ii-1), as compared to the tack performance of the rubber blends using in-situ PTOP resin (Resin i-PTOP), and the tack performance of the rubber blends using resins prepared from a mixture of in-situ PTOP and resin-grade PTBP (Resin it-1). Overall, FIG. 1 shows that the tack results from the mixed in-situ PTBP/PTOP resins (Resin ii-1) exceeded tack results from the in-situ PTOP resin (Resin i-PTOP), and the tack results from the mixed in-situ PTBP/PTOP resins (Resin ii-1) exceeded the tack results from the mixture of resin-grade PTBP and in-situ PTOP (Resin it-1)

Example 8: Preparation of In-Situ Alkylphenol Resin from In-Situ Alkylphenol (In-Situ PTBP) (Resin i-PTBP)

The reaction system was set for atmospheric azeotropic distillation, the distillation receiver was filled to 90% capacity with water, and the resin kettle was pre-heated to 100° C. Molten in-situ butylphenol (19051 kg, 126.82 kilomols) was charged into the kettle. Xylene (1360 kg, 2.4% of the in-situ butylphenol load) was charged into the batch and agitated until a homogenous solution was obtained. Dodecylbenzene sulfonic acid (74 kg, 0.226 kilomoles) was then transferred into the kettle and mixed to the molten in-situ butylphenol solution. The batch temperature is then adjusted to 130° C.

Using a subsurface addition system, 50% aqueous formaldehyde (6130 kg, 102.07 kilomoles, F/P 0.805) is metered into the batch at a sufficiently slow rate to maintain the reaction temperate at 120-130° C. The xylene layer in the distillation receiver was returned to the batch while continuously removing the water of the reaction. After the addition was completed, the reflux was maintained by heating the batch until the formaldehyde level in the reflux return was less than 1 wt %. The resin was sampled for a ball and ring soften point of 130-135° C. Post-additions of formaldehyde could be performed to adjust the softening point higher. When the resin softening point was achieved, triethanolamine (44 kg, 0.29 kilomoles) was injected into the batch to neutralize the acid catalyst. Most of the xylene was then atmospherically distilled off until the reaction temperature reached 160° C. The remaining xylene was removed using vacuum distillation to a maximum of temperature of 180° C. and 0.1 atm. The kettle was repressurized with nitrogen and the resin was sampled to obtain a ball-and-ring softening point of 133° C. and free PTBP of less than 5 wt %. At this point, the molten resin was transferred to a cooling system for final packing as solid resin flakes or pastilles. This process produced Resin i-PTBP-2.

Lowering the melting point of the final product or adding less formaldehyde during the process can produce Resin i-PTBP-1 (same in-situ PTBP resin, but having a lower melting point than Resin i-PTBP-2).

In-situ alkylphenol-aldehyde resin (Resin i-PTBP-1 and Resin i-PTBP-2) prepared above were blended in a 60/40 natural rubber/polybutadiene (NR/PBD) rubber blend at 4 phr, and the resulted rubber blended were tested for tack performance. FIG. 2 shows the tack performance (tack and tack retention) of the rubber blends using the two in-situ PTBP resins having different melting points (Resin i-PTBP-1 and Resin i-PTBP-2), as compared to the tack performance of the rubber blends using corresponding resin-grade PTBP resin (Resin r-PTBP-1 and Resin r-PTBP-2), and the tack performance of the rubber blends using resins prepared from a mixture of in-situ PTOP and in-situ PTBP (Resin ii-1).

As shown in FIG. 2, the tack results from both the in-situ PTBP resins (Resin i-PTBP-1 and Resin i-PTBP-2) exceeded the tack results from the corresponding resin-grade PTBP resins (Resin r-PTBP-1 and Resin r-PTBP-2). Additionally, FIG. 2 shows that, overall, the tack result from the mixed in-situ PTBP/PTOP resins (Resin ii-1) exceeded the tack results from the in-situ PTBP resin with a lower melting point (Resin i-PTBP-1).

Example 9: Preparation of Amine-Modified Alkylphenol-Aldehyde Resin from In-Situ Alkylphenol (In-Situ PTBP) and Stabilized by Salicylic Acid (Resin-i-PTBP-Amine-SA)

The resin kettle was set for reflux return, and pre-heated to 100° C. Molten in-situ butyl phenol (14515 kg, 96.63 kilomols) was charged to a kettle. Dodecylbenzene sulfonic acid (27.2 kg, 0.08336 kilomoles) was then transferred into the kettle and mixed into the molten in-situ butyl phenol. Using a powder transfer system, salicylic acid (725.75 kg, 5.25 kilomoles) was added to the batch, agitated for sufficient time to make a homogeneous mixture. The batch temperature was then adjusted to 95° C. Using a subsurface addition system, 50% aqueous formaldehyde (4173 kg, 69.48 kilomoles) was metered into the batch at a sufficiently slow rate to maintain the batch temperature at 90-98° C. After the addition was completed, reflux was maintained by heating the batch to 102° C. until the formaldehyde level in the reflux return was less than 2 wt %. The batch was then adjusted to 93° C., and xylene (1360 kg, 9 wt % of the in-situ butyl phenol load) was charged into the batch, and agitated until a homogenous solution was obtained.

Morpholine (1161 kg, 13.33 kilomoles) was pumped into the batch and agitated until a homogenous solution was obtained. Using a subsurface addition system, 50% aqueous formaldehyde (1311 kg, 21.83 kilomoles) was metered into the batch at a slow enough rate so as to keep the batch temperate at 90-98° C. After the addition was completed, the reflux was maintained by heating the batch to 102° C. until the formaldehyde level in the reflux return was less than 0.2 wt %. Azeotropic distillation was performed to remove the water by heating the batch to 160° C. Once water was removed, vacuum distillation was performed by heating the batch to a maximum of 170° C. and 0.1 atm, and this condition was held with agitation for one hour. The kettle was then pressurized with nitrogen. Under distillation conditions, the molten resin was heated to 180° C., and agitated until a ball and ring softening point of at least 133° C. and a free para-tert-butylphenol of less than 5 wt % were obtained. At this point, the molten resin was transferred to a cooling system for final packing as solid resin flakes or pastilles (17424 kg, 98% yield).

Characterization of the product in this example: Softening point 133-143° C.; GPC: Mw 2186-3656, Mn 862-1020; DSC: Tg 83-87° C.; FTIR: 3247 $cm^{-1}$ (50% Y, broad), 2960 $cm^{-1}$ (20% T, sharp), 1755 $cm^{-1}$ (80% T, broad), 1605 $cm^{-1}$ (75% T, broad), 1484 $cm^{-1}$ (30% T, sharp), 1362 $cm^{-1}$ (45% T, sharp), 1205 $cm^{-1}$ (45% T, sharp), 1120 $cm^{-1}$ (67% T, sharp), 819 $cm^{-1}$ (65% T, sharp). Weight % free monomers in resin: 1.5-3% morpholine, 0.05-0.7% xylene, 3.5-5% PTBP, 0.47-1% DTBP, 0.07-0.38% phenol. Melt viscosity at 180° C. was 600-800 cPs. Acid number: 47-57.

Figure 3:
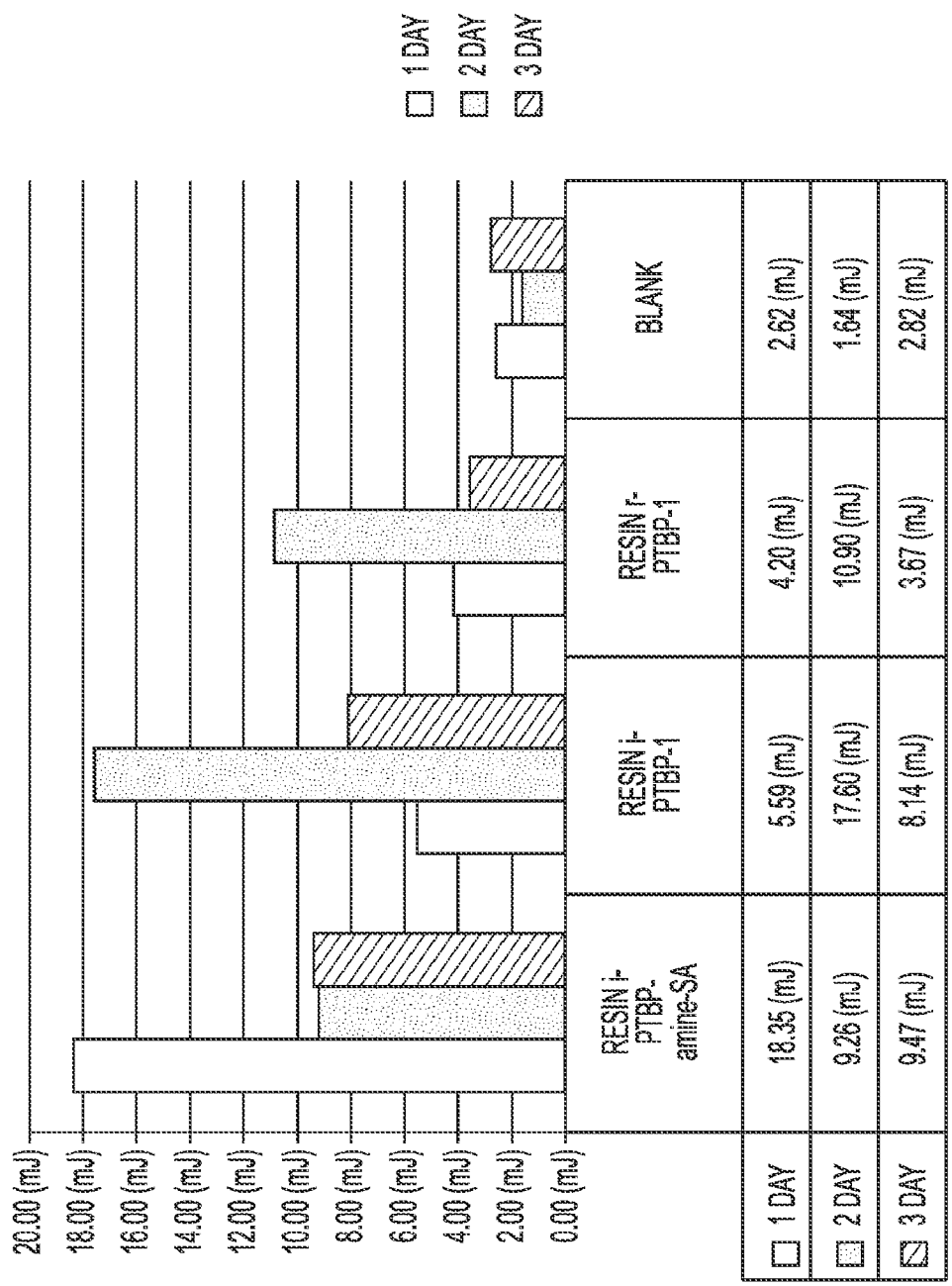
FIG. 3 shows the results of tack and tack retention of rubber blends using an in-situ resin prepared from in-situ PTBP with an amine modification and a salicylic-acid stabilization (Resin i-PTBP-amine-SA), as compared to the tack and tack retention of the rubber blends using in-situ PTBP resins with a lower melting point (Resin i-PTBP-1), and the tack and tack retention of the rubber blends using resin-grade PTBP resin with a lower melting point (Resin r-PTBP-1).

In-situ amine-modified alkylphenol-aldehyde resin amine-modified prepared above (Resin i-PTBP-amine-SA) was blended in a 60/40 natural rubber/polybutadiene (NR/PBD) rubber blend at 4 phr, and the resulted rubber blended were tested for tack performance. FIG. 3 shows the results of tack and tack retention of rubber blends using an in-situ resin prepared from in-situ PTBP with an amine modification and a salicylic-acid stabilization (Resin i-PTBP-amine-SA), as compared to the tack and tack retention of the rubber blends using in-situ PTBP resins with a lower melting point (Resin i-PTBP-1), and the tack and tack retention of the rubber blends using resin-grade PTBP resin with a lower melting point (Resin r-PTBP-1).

As shown in FIG. 3, the tack results from the amine-modified in-situ PTBP resins stabilized by salicylic acid (Resin i-PTBP-amine-SA) were better than the tack results from the in-situ PTBP resins with a lower melting point (Resin i-PTBP-1) and the resin-grade PTBP resin with a lower melting point (Resin r-PTBP-1).

Example 10: Viscosity Comparison of In-Situ Alkylphenols (In-Situ PTBP) (Resin PTBP-i) and Resin-Grade Alkylphenols (Resin-Grade PTBP) (Resin PTBP-r)

In-situ alkylphenol-aldehyde resin was prepared according to procedures similar to those described in Examples 1-2, resulting in-situ PTBP (resin PTBP-i). Resin PTBP-i was blended in a 60/40 natural rubber/polybutadiene (NR/PBD) rubber blend, and the mixing viscosity was tested. A control experiment was carried out on a resin-grade alkylphenols (resin PTBP-r), in which the same amount of resin PTBP-r was blended in the same 60/40 natural rubber/polybutadiene (NR/PBD) rubber blend, and the mixing viscosity was tested. The results of viscosity comparison are listed in Table 5.

As shown in Table 5, the differences in viscosity between in-situ PTBP and resin-grade PTBP are quite significant in various temperature levels.

TABLE 5

| Viscosity Comparison of PTBP-i and PTBP-r | | | |
|---|---|---|---|
| PTBP-i | | PTBP-r | |
| T (° C.) | cP [a] | T | cP |
| 170 | EEEE [b] | 170 | 890 |
| 180 | EEEE | 180 | 240 |
| 190 | 8000 | 190 | 154 |
| 200 | 3600 | 200 | 84 |
| 210 | 80 | 210 | 50 |

[a] cP is centaPoise or Pa * s (pascal * second);
[b] EEEE means above the measurable range of the instrument.

Although preferred embodiments have been depicted and described in detail herein, it will be apparent to those skilled in the art that various modifications, additions, substitutions, and the like can be made without departing from the spirit of the invention and these are therefore considered to be within the scope of the invention as defined in the claims which follow.

We claim:

1. An in-situ process for preparing an alkylphenol-aldehyde resin, comprising:
    providing an alkylphenol composition comprising:
        a butylphenol composition comprising one or more butylphenol compounds, each compound having one or more butyl substituents; and an octylphenol composition comprising one or more octylphenol compounds, each compound having one or more octyl substituents, wherein at least one of the butylphenol composition and the octylphenol composition is a raw alkylphenol composition;
        about 7 to about 14 wt % di-tert-alkylphenol; and
        at least about 1 wt % phenol; and
    reacting, without pre-purifying the raw alkylphenol composition, the alkylphenol composition directly with one or more aldehydes to form an in-situ alkylphenol-aldehyde resin.

2. The in-situ process of claim 1, wherein the alkylphenol-aldehyde resin is a novolak type resin.

3. The in-situ process of claim 1, wherein the alkylphenol-aldehyde resin is a resole type resin.

4. The in-situ process of claim 1, wherein the alkylphenol-aldehyde resin further comprises alkylphenol-aldehyde resins prepared from pure alkylphenol.

5. The in-situ process of claim 1, wherein the aldehyde is formaldehyde.

6. The in-situ process of claim 1, wherein the alkylphenol composition comprises about 1 wt % to about 10 wt % phenol.

7. The in-situ process of claim 1, wherein the alkylphenol composition comprises one main alkylphenol component in an amount ranging from about 50 to about 85 wt %.

8. The in-situ process of claim 1, wherein the alkylphenol composition comprises:
    about 50 to about 85 wt % para-tert-alkylphenol,
    0 to about 3 wt % ortho-tert-alkylphenol, and
    0 to about 1 wt % tri-tert-alkylphenol.

9. The in-situ process of claim 1, wherein the butylphenol composition comprises para-tert-butylphenol, di-tert-butylphenol, and optionally tri-tert-butylphenol and ortho-tert-butylphenol.

10. The in-situ process of claim 1, wherein the octylphenol composition comprises para-tert-octylphenol, di-tert-octylphenol, and optionally ortho-tert-octylphenol and tri-tert-octylphenol.

11. The in-situ process of claim 1, wherein the alkylphenol composition comprises para-tert-butylphenol, para-tert-octylphenol, di-tert-butylphenol, di-tert-octylphenol, and optionally ortho-tert-butylphenol, tri-tert-butylphenol, ortho-tert-octylphenol and tri-tert-octylphenol.

12. The in-situ process of claim 1, further comprising the step of reacting the alkylphenol-aldehyde resin with an amine, forming an amine-modified alkylphenol-aldehyde resin.

13. The in-situ process of claim 12, further comprising the step of reacting the amine-modified alkylphenol-aldehyde resin with an epoxide or a chemical reagent for stabilizing the amine moiety in the alkylphenol-aldehyde resin.

14. The in-situ process of claim 12, further comprising the step of reacting the amine-modified alkylphenol-aldehyde resin with a salicylic acid.

15. The in-situ process of claim 12, wherein the amine is morpholine.

16. The in-situ process of claim 1, wherein the butylphenol composition is a raw alkylphenol composition, and the octylphenol composition is a raw alkylphenol composition.

17. The in-situ process of claim 16, wherein the ratio of the raw butylphenol composition to the raw octylphenol composition ranges from about 90:10 to about 10:90.

18. The in-situ process of claim 16, wherein the ratio of the raw butylphenol composition to the raw octylphenol composition ranges from about 75:25 to about 25:75.

19. The in-situ process of claim 18, wherein the ratio of the raw butylphenol composition to the raw octylphenol composition ranges from about 60:40 to about 40:60.

* * * * *